INVENTOR.
AURELIO BELTRAMI
BY Irwin S. Thompson
ATTY.

April 22, 1969 A. BELTRAMI 3,440,342

TELEVIDEOPHONIC BROADCASTING AND RECEIVING SYSTEM

Original Filed Feb. 19, 1963 Sheet 2 of 2

INVENTOR.
AURELIO BELTRAMI
BY
Irwin S. Thompson
ATTY.

3,440,342

TELEVIDEOPHONIC BROADCASTING AND RECEIVING SYSTEM

Aurelio Beltrami, Via Circo No. 4, Milan, Italy

Original application Feb. 19, 1963, Ser. No. 259,525, now Patent No. 3,263,027. Divided and this application June 15, 1965, Ser. No. 464,058
Claims priority, application Italy, Dec. 11, 1962, 29,814/62
Int. Cl. H04n 3/04, 7/04
U.S. Cl. 178—6.8 7 Claims

ABSTRACT OF THE DISCLOSURE

Disclosed herein is a television broadcasting system in which the video signal is accompanied by a plurality of sound signals, all of which are transmitted on a single modulated signal.

This application is a division of application Ser. No. 259,525, filed Feb. 19, 1963, now Patent No. 3,263,027.

The present invention relates to an improved radiotelevision broadcasting and receiving system, according to which video signals and one or a plurality of phonic signals may be transmitted at a time as a single modulated composite signal.

The main object of the invention is to provide a television broadcasting system wherein the voltages for forming the reticle, both for the camera tube at the transmitting station, and for the kinescopes of the different receivers, are generated in a very simple way, at the transmitting station itself, and these same signals, at the frame frequency and at the line frequency, are eventually utilized together with other signals, generated in the same way, as carriers for the video and audio signals to be transmitted, and all these signals, together with those forming the reticle on the different receiving tubes being mixed together and transmitted by a conventional wireless transmitter on a single carrier wave.

A television broadcasting system, constructed and operated according to the present invention, affords a very remarkable reduction in costs, size and weight, both for the transmitter and for each receiver, and offers moreover the possibility to have the video accompanied not by one, but by two, three and even more simultaneous phonic or sound transmissions. This is an advantage, the importance of which will steadily increase as television transmission will be broadcast over wide zones of territory, inhabited by a population speaking different languages.

To the above-mentioned advantages, the system of this invention adds the advantage of reducing the frequency bands, necessary for videophonic transmissions; for instance, it will be possible to reduce the width of the band from 7 to 5 megacycles per second, as well as permitting the adoption of a single type of modulation.

In fact, in a conventional television transmission system there is required a 5 megacycle per second band width of frequency for the transmission of the video and the reticle synchronism signals, while a 2 megacycle per second band width is required for the transmission of the audio signals, that is, altogether a band width of 7 megacycles per second; also there are further required in this system two modulations, i.e., an amplitude modulation for the video, and a frequency modulation for the audio.

The primary object of the present invention is to provide a television transmission system in which the audio and the video signals are mixed together with those at the line and frame frequencies, to form a single composite signal that covers a frequency band of 5 megacycles per second only, and it is thus possible to have a single amplitude modulation. Those skilled in the art will realize immediately the important simplifications and advantages that are obtained with the present invention, both at the transmitting station and at the single receivers.

Another object of this invention is to provide in the system of this invention a reticle voltage generator of the type disclosed in my Patent No. 3,042,747 of 1962, filed Nov. 23, 1956 in order that the different signals at the frame frequency and at the line frequency, utilized according to this invention shall be always in a perfect phase synchronism among themselves.

A further object of this invention is to provide a device for generating the reticle on the receiving kinescopes and the scanning camera, comprising: a revolving element, disc or cylinder, on which there are traced one or more patterns or tracks, adapted to modulate, by transparence or reflection, radiations that, in the form of a thin blade, scan the above-mentioned tracks; transducing elements, one for each of the above tracks, and adapted to transform said modulated radiations into periodic electrical magnitudes, destined to generate the television reticle, as well as a small synchronous motor for driving the above-mentioned revolving element, carrying the tracks.

Still another object of this invention is the provision, at each receiver, of a discriminator adapted to separate each phonic signal from the other and send it to a particular sound equipment.

With these and other objects in view, the radio-television broadcasting system of this invention comprises certain novel arrangements of component parts, instrumentalities including a transmitting section of the system comprising an amplitude modulation radiophonic transmitter combined with a video pickup camera of a conventional type and a rotating generator of the reticle voltage type in which various audio signals and the video signals are mixed together with those at the line and frame frequencies to constitute a single composite narrow frequency band signal having a single amplitude modulation which is transmitted by an oscillator, the signal being received by a receiver which demodulates the carrier signal from the combined audio and video signals, directing the video signals through a limiter-separator having its output connected to a viewing kinescope, and the different audio signals are passed through a discriminator network which selectively directs each audio signal to its respective headphone or hearing transducer for use by viewing personnel of the viewing kinescope.

Figure 1:
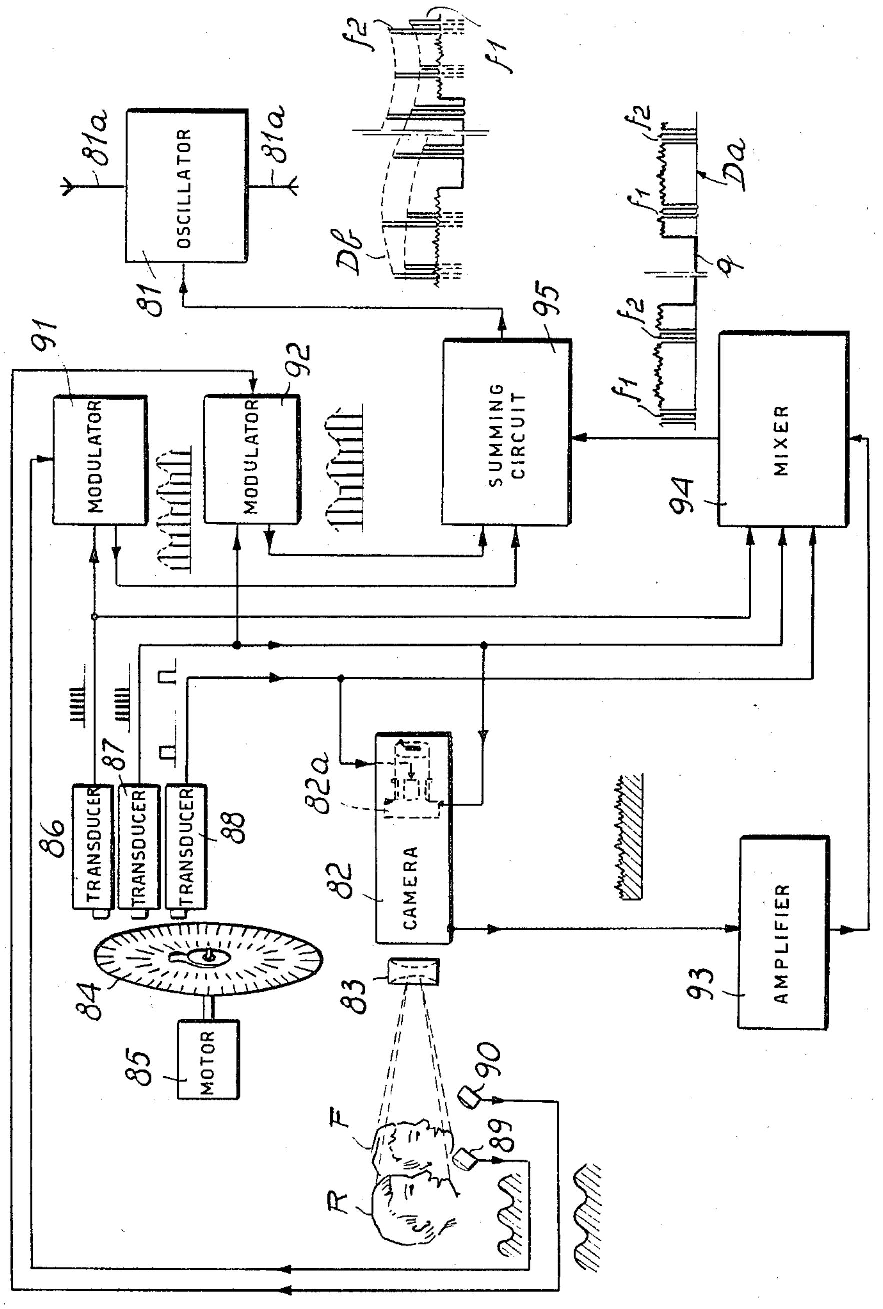
FIGURE 1 is a circuit block diagram illustrating the different component parts and their arrangement in the transmitting portion of a televideophonic system of the present invention.

In the drawings the wave forms or shapes of the different signals at the most characteristic points of the circuits are shown.

Figure 2:
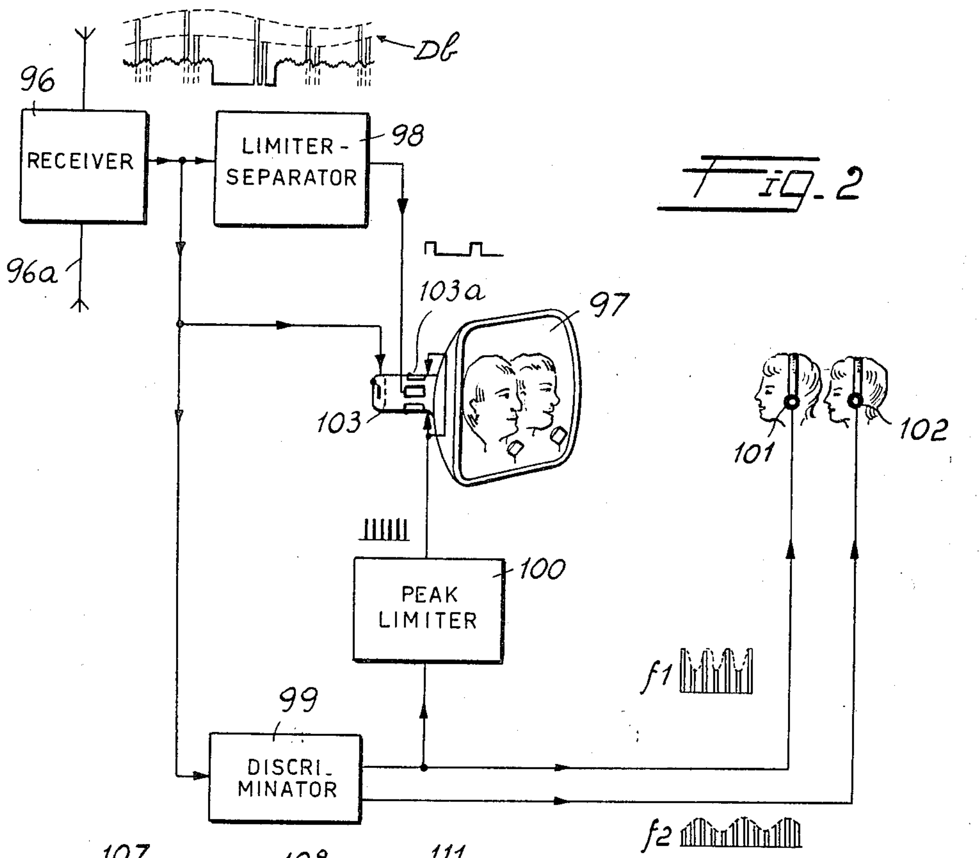
FIGURE 2 is a circuit block diagram of a reecive portion of the televideophonic system of the present invention.

As is evident from FIGURES 1 and 2 of the drawings, the transmitter of the system in question in an amplitude modulation radiophonic transmitter, combined with a camera tube and a rotating generator of the reticle voltages and each receiver is a large band radio-receiver combined with a kinescope.

In FIGURE 1, where there are illustrated in some detail only the characteristic elements, 81 indicates the irradiating oscillator, generating the carrier wave amplitude modulated by the composite videophonic signal in wave form as D*b*, *f*1 and *f*2. A camera 82 is shown having a camera tube 82*a* and an object lens member 83 for focusing the image to be transmitted. The reticle generator for the camera 82 comprises a disc 84 driven by a small synchronous motor 85. As shown, disc 84 carries three tracks; one for the line signal, obtained through the transducer 86, and destined to form the carrier for the first phonic signal; a second track, at the same frequency as the preceding one, is adapted to generate, through the transducer 87, the carrier voltage for the second phonic signal; and a third track, adapted to generate through the transducer 88, the frame frequency voltage for the tube 82 reticle. Of course, the above voltages could be obtained with a different number of tracks. Reference characters R and F indicate the figures of two people that are speaking simultaneously in two different languages, and it is convenient that these figures form the image it is desired to transmit. The two phonic signals coming from the two microphones 89 and 90 are fed to the modulators 91 and 92 respectively, to modulate said two carrier voltages at the outputs of the transducers 86 and 87.

The video signal at the output from the television camera 82, if necessary, is amplified by the video amplifier 93, and then fed to a composite circuit network 94 to which is also fed the three voltages from the outputs of the three transducers 86, 87 and 88. At the output of the circuit 94 there appears the video signal, no longer continuous as when it entered same, but interrupted by the two phonic signals (*f*1 and *f*2) and by the frame signal (*q*) as is quite evident from the diagram D*a*, shown in FIGURE 1 on the side of the respective lead.

The signal at the output from the circuit 94 is fed to the summing circuit network 95, to which there are also fed the impulses modulated respectively by the two phonic or sound signals, in the modulators 91 and 92. The complete or composite signal, at the output of the summing circuit 95, is sent to modulate the wave generated by the irradiating oscillator 81 and thence irradiated in order to be picked up by the different receiver stations.

The receiver of every subscriber in the system of this invention is diagrammatically shown in FIGURE 2, which is similar to a radio receiver and more precisely it comprises: a radio receiver 96 with antenna 96*a* where there is obtained, as a demodulation product, the videophonic signal; a kinescope 97, a limiter-separator 98 for the frame signal, a limiter-separator or discriminator 99 for the two phonic signals, a trimmer or peak limiter 100 of the modulated line signals, and two headsets or other hearing devices 101, 102 for the separate and simultaneous audition of the two phonic signals.

The operation of the new radiotelevision system is as follows: When the receiver of FIGURE 2 is operating and the transmitter of FIGURE 1 is transmitting to the antenna 96*a* of the radio receiver 96, there will arrive the carrier wave of a predetermined frequency, modulated by the complete signal and irradiated by the antenna 81*a* of the transmitting oscillator 81. This carrier wave will be demodulated in receiver 96 and, from the resulting complete or composite signal, there will be separated, in limiter-separator 98, the frame frequency signal that is sent to the respective frame deflection coils 103*a* of the kinescope 97. On the other and, the complete signal is supplied to the grid 103 of the kinescope 97, as well as to the limiter-separator or discriminator 99, where the two phonic signals are separated, and then sent respectively to the two hearing devices or earphones 101 and 102. The line frequency signal supplied from the transducer 86 and which had been modulated at the transmitter with one of the phonic signals is sent, over the trimmer or limiter 100, to the line deflection coils 103*a* of the kinescope 97. Thereby, on the screen of said kinescope there will be produced by the cathode beam a reticle in perfect synchronism with that of the pickup camera 82 at the transmitting station, and two or more people will all be able to watch the same image, while one can hear one of the phonic transmission in one language, and the other (or others) can hear the transmission in another language, different from the first one. In the preferred embodiment of this invention as illustrated, there have been considered two simultaneous phonic signals only, but it is to be understood that the number of said simultaneous phonic signals may be increased without causing difficulties in the embodiment of the relative equipment as described above.

Of course, the carrier-signals for the single phonic signals shall have, at the input of the discriminator, sufficiently different amplitudes to allow the separation of each single phonic signal from the others.

Figure 3:
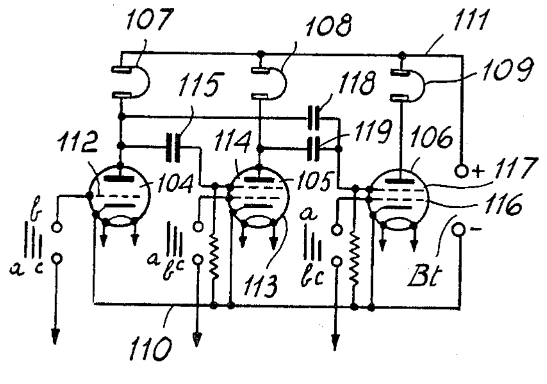
FIGURE 3 is a schematic diagrammatic view in detail of the discriminator circuit employing thermionic tubes for separation of the various audio signals at a receiving station.
Figure 4:
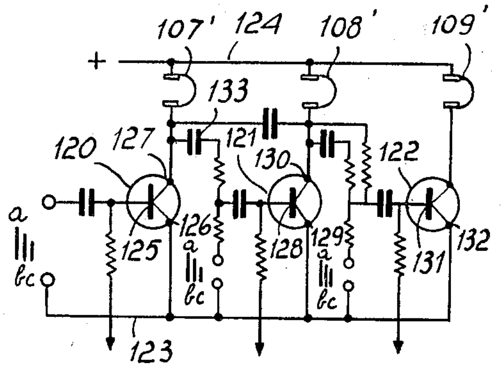
FIGURE 4 is a similar view of a corresponding discriminator circuit, but using semiconductors, transistors, or the like, instead of thermionic tubes for selective separation of the various audio signals at a receiving station.

In FIGURES 3 and 4, there are shown the schematic electrical circuit diagrams of two phonic signal limiter-separators such as that shown with 99 in FIGURE 2, but wherein the phonic signals to be separated are three.

The circuit of FIGURE 3 includes three electronic tubes 104, 105 and 106, the first of which is a triode, and the others of which are tetrodes; on the anode circuits of each of these tubes are connected headsets 101 and 102 of FIGURE 2, or other hearing devices which, in FIGURE 3, are respectively indicated with reference numerals 107, 108 and 109. Of course, if at a receiving station it is only desired to hear a single phonic signal, there will be only one hearing device inserted in the corresponding anodic circuit for that phonic signal.

In FIGURE 3, the tubes 104, 105 and 106 are connected in parallel on the leads 110 and 111 leading to the anode battery B*t*. To the grid 112 of the triode 104 there is applied the composite signal comprising the three phonic signals *a*, *b* and *c*. Each of said signals modulates voltage impulses, each of an adequately different value than the other. To the same grid 112 there is applied a biasing negative voltage such as to intercept the carrier voltages of smaller value, modulated by the two phonic signals *b* and *c*, whereby only the signal *a* can pass into the anode circuit of the tride 104, and thus be heard alone through the headset 107 or the like.

To the first grid 113 of the tube 105, biased so as to intercept only the signal *c*, there is also applied the composite signal containing the three phonic signals *a*, *b* and *c*, while to the second grid 114 there is applied, through the capacitor 115, the voltage corresponding to the signal *a*, whereby in the anode circuit of said tube there will pass only the signal *b*, that will be audible in the headset 108, inasmuch as upon passage of the signal *a*, the tube 105 is blocked.

Similarly, to the second grid 117 of the tube 106 there are applied, through the capacitors 118 and 119, the signals *a* and *b*, whereby of the three signals forming the composite signal applied to the grid 116, and there will pass in the anode circuit of said tube only the signal *c*, audible in the headset 109.

FIGURE 4 shows the diagram of another discriminator or separator circuit similar to that of FIGURE 3, but wherein the electronic tubes are replaced by three semiconductors or transistors 120, 121 and 122.

Even in this instance, in the collector circuits of said three transistors there are connected the headsets 107′, 108′ and 109′. Said transistors are shunt connected on the conductors 123 and 124, leading to an anode battery. Between the base 125 and the emitter 126 of the transistor 120 there is applied the composite signal including the three audio signals *a*, *b* and *c*. The base 125 will be biased so as to intercept the voltages of the carrier waves contained in said composite signal and of a smaller magnitude, so that only the signal *a* will be able to pass in the collector 127, and thus alone be heard in the headset 107′.

To the base 128 of the transistor 121, biased so as to intercept only the signal *c*, there is again applied the composite signal containing all of the three audio signals *a*, *b* and *c*, as well as part of the voltage corresponding to the signal *a*, circulating in the collector circuit of the transistor 120. This last voltage is being applied with reversed polarity, through the capacitor 133, so that from the collector 130 of the transistor 121 will come out a voltage corresponding to the signal *b* only.

In a similar way, between the base 131 and the emitter 132 of the transistor 122 there will be applied the composite signal containing the audio signals *a*, *b* and *c*, and to said base 131 there also applied the voltages coming out from the collectors 127 and 130 of the two preceding transistors, even in this instance with reversed polarity, whereby in the headset 109', connected in the collector circuit of the transistor 122, there will be heard only the audio signal *c*.

As the number of the phonic signals to be simultaneously transmitted increases, it is desirable to increase the intensity of the impulses carrying the phonic signals, and then the length of the reticle lines so that the portion of each impulse influenced by the phonic signals will leave the kinescope screen.

In a transmitter such as that of FIGURE 1, the pickup camera tube 82*a* preferably should be of the flying spot oscillographic type for the transmission of movie films or the like, while it advantageously will be a tube of the bunching type (image orthicon, or vidicon, or the like) for the direct pickup of scenes or objects.

The above described system may also be constructed with an interlaced reticle, as is easily understood by those skilled in the art.

The track printed on the rotating disc member 84 of the generator of the electric voltages, necessary for generating the reticle on the cathode ray tube screen and for the other tasks stated above, may be of any desired or preferred type. There may thus be tracks of the type that can be scanned with luminous or invisible radiations, or of an electrical, electronic, magnetic or equivalent type, and combined with corresponding members for transducing in electrical magnitude all that is printed on said tracks.

From the preceding description it is apparent that the present invention uniquely provides a television broadcasting and receiving system having equipment and instrumentalities which are extremely simple and inexpensive. Furthermore, it uniquely allows the system to transmit a single video and many phonic signals simultaneously.

From the foregoing it will now be seen that there is herein provided an improved radiotelevision broadcast and receiving system which transmits video signals and a plurality of different audio signals, each audio signal corresponding to a different language in which the video and audio signals are transmitted as a single modulated composite signal which is selectively demodulated by a receiver in which the carrier signal is removed and the composite signal comprising the video one is transmitted to the grid of a viewing kinescope while from the same composite signal, through a limiter-separator is separated the frame frequency signal, and the different audio signals are separated in a limiter-discriminator so as to be heard separately, while a portion of one of said audio signals is used through a trimmer for peak limiting purposes, as line frequency signals with connection with the operation of the kinescope. The said separated audio signals are fed selectively to headphones, for instance one for each of many languages transmitted.

It is to be noted that the system and equipment described above and illustrated in the drawings are merely for purpose of illustration and are not to be construed in a limiting way within the purview of the invention, but that the types and characteristics of the different components of the system may vary according to requirements without departing from the scope of the present invention.

I claim:

1. A television system having a transmitting station and a plurality of receiving stations, said transmitting station comprising a transmitting oscillator, a video camera member for transmitting a video signal, sound means for transmitting a plurality of sound signals, voltage generating means for the reticle of said video camera and of kinescopes of the receiving stations, and as carrier voltages for said sound signals; as many modulating means connected to the outputs of the voltage generating means as there are means for transmitting sound signals, a mixer connected to said camera member and to said voltage generating means, a summing circuit connected to said mixer and said modulating means and connected with its output feeding through said transmitting oscillator a composite signal, each receiving station comprising a receiver and a kinescope, a demodulator for producing signals devoid of the frequency of the transmitting oscillator, a limiter-separator connected to the output of the demodulator for separating the frame frequency voltage from the received composite signal, a limiter-separator also connected to the output of the demodulator for separating the different sound signals from one another, a trimmer of the modulated line signals connected in between the limiter-separator and the kinescope for feeding the line synchronizing voltages to the kinescope and as many hearing devices connected to the output of the limiter-separator as sound signals are received.

2. A television system as claimed in claim 1, wherein the generator of synchronized waves for reticle and carrier voltages is a rotating member having a plurality of tracks thereon, a plurality of transducers adjacent said tracks and producing said synchronized voltages, and a motor connected to said rotating member.

3. A television system according to claim 1, wherein the discriminator at each receiving station comprises as many thermionic tubes as there are sound signals to be separated, said signals having different amplitudes, said tubes being connected in parallel, each tube comprising at least a grid and a cathode receiving the sound signals transmitted, means for biasing the grids of all of said tubes, the grid of the first of said tubes being biased so that the tube is conductive only for the first sound signal in the composite signal, the other tubes having a pair of grids, the first of the pair of grids being biased and connected so as to respond to one of the sound signals of smaller amplitude to be received, and the second grid being biased by the sound signals collected by the preceding tubes so that in the anode circuits associated with a particular sound equipment there is heard only one sound signal.

4. A television system according to claim 1, wherein the discriminator at each receiving station comprises as many semiconductors as there are sound signals to be separated, said signals having different amplitudes, said semiconductors being connected in parallel, each of said semiconductors comprising a base, emitter, and collector, means for biasing the bases of all of said semiconductors, the base of the first semiconductor being biased so that the semiconductor is conductive only for the first sound signal in the composite signal, the other semiconductors being biased and connected so as to respond to one of the sound signals of a smaller amplitude to be received so that the collector circuits associated with a particular sound equipment provides for receipt only of one sound signal for each said sound equipment.

5. A radiotelevision broadcasting and receiving system for transmitting video signals and a plurality of different language audio signals simultaneously comprising a broadcasting station and receiving stations; said broadcasting station comprising a video pickup camera, a video amplifier operatively connected to said camera, a synchronous generator means of the reticle voltage type, microphones for each language of audio signals, a modulator, one for each microphone, operatively interconnected between the microphone and said synchronous generator, a mixer adapted to receive the video signals from the video amplifier and said audio voltage signals from the generator and having an output, a summing circuit network connected to said modulators and being further connected to the output of said mixer and a transmitting oscillator connected to the output of said summing circuit network adapted to transmit said video and audio signals as a single modulated composite signal; each receiving station comprising a kinescope, a receiver for receiving and demodulating said transmitting composite signal into a demodulated signal, said demodulated signal being interconnected to a limiter-separator network having an output, and interconnected to the grid of the kinescope and being further connected to an audio discriminator network having a plurality of different language audio outputs selectively connected to a headphone of each respective language transmitted, one output of said discriminator circuit being operatively connected to a peak limiter network interconnected to said kinescope as a line synchronization control means for the transmitted video signals.

6. A radiotelevision receiver system as in claim 5, wherein said discriminator network comprises at least as many thermionic tubes as there are sound signals to be separated, said signals having different amplitudes, said tubes being connected in parallel, each of said tubes comprising at least a grid and a cathode receiving the sound signals transmitted, means for biasing the grids of all of said tubes, the grid of the first of said tubes being so biased that the tube is conductive only for the first sound signal in the composite signal, the other tubes each having a pair of grids, the first grid being biased and connected so as to respond to one of the sound signals of smaller amplitude to be received and the second grid being biased by the sound signals collected by the preceding tubes so that in the anode electrode circuits associated with a particular sound equipment, there is heard only one sound signal.

7. A radiotelevision receiver system as in claim 5, wherein said discriminator network comprises a plurality of semiconductors for said sound signals to be separated said signals having different amplitudes, said semiconductors being connected in parallel, each of said semiconductors comprising a base, emitter, and collector, means for biasing the bases of all of said semiconductors, the base of the first semiconductor being biased so that the semiconductor is conductive only for the first sound signal in the composite signal, the other semiconductors being so biased and connected as to selectively respond to one of the sound signals of a smaller amplitude to be received so the collector circuits associated with a particular headphone or sound transducer provide for receipt of only the audio signals of a particular language for the viewer of the receiving kinescope.

References Cited

UNITED STATES PATENTS

| | | | |
|---|---|---|---|
| 2,398,642 | 4/1946 | Homrighous | 178—5.6 |
| 2,401,384 | 6/1946 | Young | 178—5.6 |
| 2,502,213 | 3/1950 | Fredendall et al. | 178—5.8 |
| 2,539,440 | 1/1951 | Labin et al. | 178—5.6 |
| 2,653,184 | 9/1953 | Robinson | 178—5.6 |
| 2,986,597 | 5/1961 | Teer | 178—6 |

ROBERT L. GRIFFIN, *Primary Examiner.*

RICHARD K. ECKERT, Jr., *Assistant Examiner.*

U.S. Cl. X.R.

178—7.2, 7.5